United States Patent [19]

Taylor

[11] 4,282,409
[45] Aug. 4, 1981

[54] SPEECH NETWORKS FOR TELEPHONE SETS

[75] Inventor: Raymond G. Taylor, Shreveport, La.

[73] Assignee: Western Electric Company, Inc., New York, N.Y.

[21] Appl. No.: 86,024

[22] Filed: Oct. 17, 1979

Related U.S. Application Data

[63] Continuation-in-part of Ser. No. 72,252, Sep. 4, 1979.

[51] Int. Cl.³ .............................................. H04M 1/00
[52] U.S. Cl. .................................................. 179/81 R
[58] Field of Search ................. 179/81 R, 81 A, 81 B, 179/1 HF, 1 VC, 1 SW

[56] References Cited

U.S. PATENT DOCUMENTS

| | | | |
|---|---|---|---|
| 2,842,623 | 7/1958 | Lehr | 179/81 B |
| 3,283,074 | 11/1966 | Csicsatka | 179/1 VC |
| 3,588,359 | 6/1971 | Cribb | 179/1 R |
| 3,849,603 | 11/1974 | Proios | 179/1 H |
| 3,860,756 | 1/1975 | Shinoi et al. | 179/81 B |
| 3,876,835 | 4/1975 | Barnaby et al. | 179/1 VC |

OTHER PUBLICATIONS

W. F. Chow et al., "MAC-4: A Single-Chip Microcomputer", Bell System Technical Journal, vol. 58, No. 4, pp. 959–962, Apr. 1979.

*Primary Examiner*—Joseph A. Popek
*Attorney, Agent, or Firm*—J. L. Landis

[57] ABSTRACT

A speech network (11) for a telephone set including a receiver (12) circuit and a transmitter (13) circuit connected in parallel between a tip lead (16) and a ring lead (17). An amplifying transistor (Q4) can be connected in either of two modes, including a normal receive mode for amplifying received signals from the line and applying the amplified receive signal to the receiver circuit. A voice-operated switching unit (Q6,20) is provided for sensing a voice-signal output from the transmitter and connecting the transistor (Q4) in a transmit mode, in which the transistor amplifies the transmitter output for transmission to the line. A sidetone generating circuit (R31, Q5) is connected in parallel with the receiver circuit in the transmit node, for applying a reduced portion of the amplified transmit signal to the receiver.

10 Claims, 1 Drawing Figure

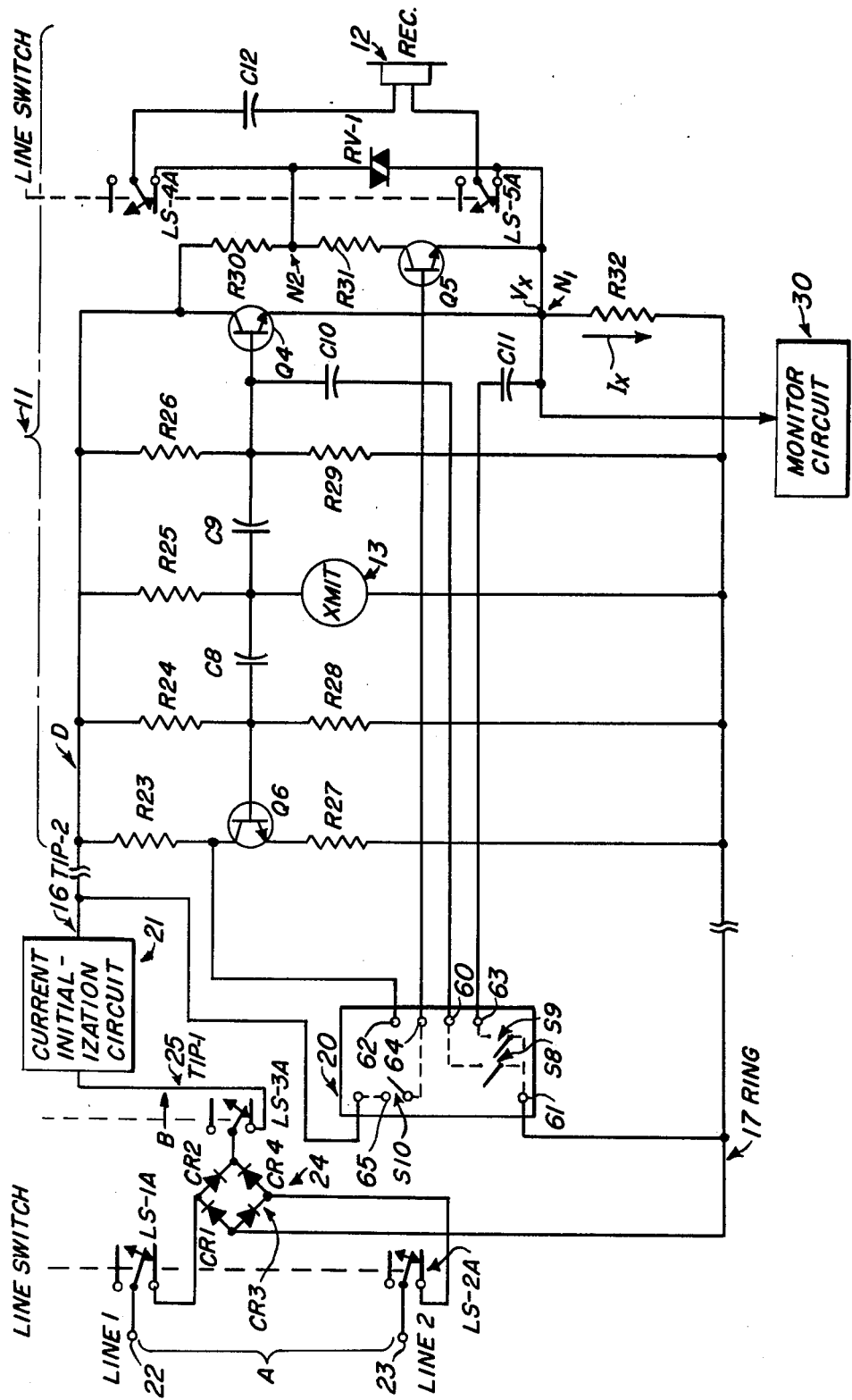

SPEECH NETWORKS FOR TELEPHONE SETS

CROSS-REFERENCE TO RELATED APPLICATION

This application is a continuation-in-part of my copending application "Circuits and Methods for Initializing the Loop Current of a Telephone Set," Ser. No. 72,252, filed Sept. 4, 1979, herein incorporated by reference.

FIELD OF THE INVENTION

This application relates generally to speech networks for telephone sets, and particularly to speech networks for low-power electronic telephone sets that can be powered solely from the central office line inputs. In particular, it is desired to provide a simple transistorized speech network with a voice-activated switching unit for switching the set from a receive mode to a transmit mode, and for generating sidetone in the transmit mode.

BACKGROUND OF THE INVENTION

In connection with the development of proposed new low-power electronic telephone sets, preferably sets of universal, as nearly worldwide applicability as is feasible, it is desired to provide a set that automatically generates a substantially constant, relatively low-voltage speech network tip-to-ring supply voltage and a uniform, equalized speech network loop current, as described in detail in the copending application cited above, such as 6 volts ±¼ volt and 20–25 ma in a typical example, regardless of the input supply voltage to the set.

In conventional American telephone networks (no active devices in the speech network), the impedance of the set is matched (by varistor networks built into the set) to that of the transmission line by drawing relatively high telephone set currents (such as 150 ma) on short loops and relatively low currents (such as 20 ma) on long loops. Such networks are inherently passive (no gain), and cannot boost transmitted signal level or increase receive sensitivity.

SUMMARY OF THE INVENTION

In view of the foregoing discussion, a specific object of this invention, in conjunction with the circuits of the copending application, is to provide a substantially universal low-power electronic telephone set network in which the loop current of the set is automatically initialized at a desired level, and in which the transmit and receive signals are amplified by a simple transistor and switching network in accordance with the principles of this invention. A significant advantage to such combination is a saving in network power consumption, because each telephone set would require the same operating current (e.g. 20 ma) independent of the loop length.

More general objects of the invention are to provide new and improved amplification circuits for speech networks, particularly circuits in which a single transistor amplifier can be configured in two distinct modes, a transmit mode and a receive mode, so as to amplify respectively a voice signal output from the transmitter for transmission to the line, and to amplify a received signal from the line for application to the receiver.

In particular, it is desired to provide a voice-activated switching unit for separating transmitter signals from received signals, for reconfiguring the amplifier accordingly, and for generating a predetermined level of sidetone to the receiver in the transmit mode.

With the foregoing and other objects in view, a speech network in accordance with certain features of the invention is used in combination with a telephone set having a receiver circuit and a transmitter circuit connected in parallel between tip and ring leads connected to a telephone line. Such a network includes transistor means, normally connected between tip and ring in a first configuration or receive mode, for amplifying a received signal from the line and for applying the amplified received signal to the receiver circuit. The network further includes a switching unit, activated by a voice-signal output from the transmitter, for connecting the transistor means in a second configuration or transmit mode for amplification of the transmitter output by the transistor means and transmission of an amplified transmit signal to the line.

Preferably, a sidetone signal mechanism is connected to the receiver circuit by the switching unit when a voice signal output is received from the transmitter, for applying a reduced portion of the amplified transmit signal to the receiver. In one embodiment, the transistor means includes a single bipolar amplifying transistor normally connected in a common emitter, receive mode to amplify received signals and to apply the amplified signal to the receiver, which is connected in parallel with the collector-emitter circuit of the transistor by an R-C network. When a voice-signal output is generated by the transmitter, above a preset threshold level, the switching unit senses the transmitter output and switches the transistor to a common base, transmit mode, for amplification of the transmitter output and transmission of the amplified transmit signal to the line.

Preferably, the circuit includes a second transistor for sensing a transmitter output above the threshold level so as to trigger the switching unit or controller, and a third transistor that is connected in a voltage divider network in parallel with the receiver in the transmit mode, so as to apply a portion of the amplified transmit signal to the receiver as sidetone.

Other objects, advantages and features of the invention will be apparent from the following detailed description of a specific embodiment thereof, when read in conjunction with the accompanying drawing.

BRIEF DESCRIPTION OF THE DRAWING

In the drawing, the single FIGURE is a circuit diagram of a speech network for an electronic telephone set, in accordance with one specific embodiment of the invention.

DETAILED DESCRIPTION

Referring now in detail to the drawing, there is illustrated a speech network 11 for an electronic telephone set, in accordance with one specific embodiment of the invention. The speech network 11 including a conventional telephone receiver 12 and a conventional transmitter 13 connected in parallel between a "tip" lead 16 (designated "tip-2") and a "ring" lead 17 by an R-C network including resistors R23-R32 and capacitors C8-C12, arranged as shown, and by a set of three transistors Q4, Q5, Q6 that are selectively operated by a switching unit or controller 20, as will be described.

GENERAL ARRANGEMENT OF TELEPHONE SET AND CURREN-INITIALIZATION SYSTEM

Preferably, the network 11 is used in conjunction with a circuit 21 for automatically initializing the loop current of the set at a desired level, such as 20-25 ma in a typical example as described in my copending application referred to above. In this arrangement, when the telephone handset is taken off-hook, a set of conventional line-switch contacts LS-1A through LS-5A close, at which time a D.C. input signal "A" from the central office is applied to the telephone set via input terminals 22 and 23, in generally conventional fashion. The input signal A in this example is a modulated D.C. carrier wave having a typical range of eight to twenty-four volts, depending on the telephone system and depending on the transmission-line loop length that is, the length and impedance characteristics of the transmission line from the central office to the particular telephone set in question.

The input signal A is routed through a polarity guard 24, consisting of a diode bridge CR1 to CR4, to provide an intermediate output signal B (essentially identical to the input signal A) between a "tip-1" lead or bus 25 and the "ring" lead 17, which may be regarded as a common circuit ground for the purpose of this application. The intermediate signal B on the tip-1 bus 25 is applied to the current-initialization circuit 21, which is connected between the tip-1 input bus 25 and the "tip-2" output drive bus 16 for the speech network 11, to provide a regulated voltage output signal D on the tip-2 bus 16.

As described in detail in the copending application, the initialization circuit 21 functions to vary the tip-2 supply voltage and thereby to preset the telephone set loop current at a desired constant level. Specifically, when the telephone set first goes off hook, the output voltage on the tip-2 bus is essentially equal to the full input supply voltage A from the central office, at the input terminals 22-23. At this time, the various components of the speech network are connected between the tip-2 bus and the ring lead 17 as will be described, the receiver being connected in the network between a pair of circuit nodes designated N1 and N2 by the line-switch contacts LS-4A and LS-5A, which close when the handset is taken off hook.

As the speech network 11 is so connected and initially powered between tip-2 and ring at essentially the input supply voltage A, a corresponding loop current (designated $I_X$) is established which produces a voltage $V_X$ between the circuit node N1 and the ring lead 17 through the resistor R32, the node N1 being an intermediate node or bus connected as shown in the network 11 on the ring side of the receiver 12 and the transistor Q4. Depending on the effective resistance of the various network components connected between the tip-2 bus and the node N1, the node voltage $V_X$ established at N1 is a function of the tip-2 supply voltage which also sets the value of the loop current $I_X$.

For example, the full line input voltage to the set might range from 8-24 volts, resulting in a loop current $I_X$ of 30 to 100 ma. In a typical example, it is desired to regulate the loop current via adjustment of the initialization circuit 21 to an operating range where the tip-2 voltage is set at 6 volts $\pm \frac{1}{4}$, $V_X$ is $2\frac{1}{4}$ volts $\pm \frac{1}{4}$, and $I_X$ is in the range of 20 to 25 ma. To achieve this current-initialization function, a circuit 30 is provided for monitoring the loop current, by sensing the node voltage $V_X$, and for operating the initialization circuit 21 in a series of discrete steps until the loop current has been reduced to the desired level, as described in the copending application.

OPERATION OF SPEECH NETWORK 11

After the current-initialization process described above has been completed and the set is ready for operation to receive or transmit speech signals, the speech network 11 is normally conditioned by the controller 20 in a first or "receive" mode, in which the transistor Q4 serves as a conventional amplifier stage for received signals. For this purpose, the capacitor C10 is connected between the base of Q4 and a controller input pin 60, and is normally connected to the ring lead 17 by a normally closed controller switch designated S8 and a reference pin 61 connected to the ring lead 17. This turns Q4 ON and configures Q4 for maximum gain of an emitter injected signal. (At this time, transistor Q5 is turned OFF, and an emitter bypass capacitor C11 is disconnected from the circuit, as will be discussed hereafter.)

In this first, or receive mode configuration of the set and the transistor Q4, a received speech signal is superimposed on the initializing current flowing through the set, which flows through Q4, with the received signal per se appearing at the emitter of Q4. The fully amplified receive signal appears at the collector of Q4 and is applied to the receiver 12 of the telephone set via R30 and C12, thence to the intermediate circuit bus or node N1 discussed above and to the ring lead 17 via R32 as described above. A varistor RV-1 is connected in parallel with the receiver 12, between N2 and N1, to suppress clicks, as is conventional.

Although components C10, C11 and Q5 configure Q4 in the "receive mode" as described above, D.C. current flows through R25 and the transmitter 13 to enable or "arm" the transmitter for normal operation. The speech network 11 remains in the receive mode until the acoustic input to the transmitter 13 exceeds a given threshold level, at which time a transmit signal applied through C8 to amplifier stage Q6 provides sufficient input drive to operate the controller 20 via Q6 to alter the speech network from the receive mode to a "transmit mode." For this purpose, the transistor Q6 serves as a peak detector or switch, that amplifies the signal across the transmitter 13 and applies a switching signal to an interrupt pin 62 of the controller 20, which opens the controller switch S8 to disconnect C10 from the Q4 base and which also connects the emitter bypass capacitor C11 to the ring lead 17 via a controller input pin 63, a controller switch designated S9, and the ring-lead reference pin 61. Also, at this time, the transistor switch Q5 is turned ON by the controller, by sourcing the base of Q5 to the tip-2 bus 16 via a pin 64, a switch designated S10, and a reference pin 65 connected to the tip-2 bus 16.

In the transmit mode, the output of the transmitter 13 is applied to the base of Q4 through the capacitor C9, for amplification and transmission to the line. In this mode, the transistor Q5 serves to apply sidetone to the receiver 12 via a voltage divider network consisting of R30, R31, and the resistance of Q5, in which the receiver 12 is connected to the juncture of R30 and R31 so that a predetermined fraction of the transmitted signal is routed to the receiver 12 as sidetone, as is generally well known in the art.

With these arrangements, a simple solid-state, voice-activated speech network is provided for separating the transmit signals from the received signals, amplifying each with a single transistor Q4 operating in two modes, and generating sidetone when transmitting. The network can be powered solely from the central office and controlled by a relatively simple switching unit or controller 20, such as a microcomputer chip as will be described in the following section.

The transistors Q4, Q5, Q6 are preferably conventional NPN transistors having the requisite static/dynamic characteristics as will be readily apparent. Preferably, the transistors Q4, Q5, Q6 and two additional transistors (not shown herein) forming a Schmitt trigger circuit in the sensing circuit 30, as described in the copending application, are all formed as parts of a single conventional integrated circuit, although they may also be discrete devices.

CONTROLLER 20

Obviously, the specific details of the controller 20, preferably an integrated circuit of the type referred to as a "microprocessor" or "microcomputer" chip in modern parlance, are not important to the practice of the invention. In the embodiment of the invention illustrated, the controller 20 can be any known type of switching circuitry that is capable of responding to a binary input from the sensing transistor Q6, to operate a set of switches such as S8, S9 and S10 to connect the transistors Q4 and Q5 and the capacitors C10 and C11 in the network as described above, such as the Texas Instrument TMS-1000 family of microcomputer chips.

Preferably also, the controller 20 performs numerous other functions in the operation of the telephone set to provide an assortment of features, including the loop current sensing and current-initialization functions described in the copending application.

In a specific example, the controller is a CMOS "single-chip microcomputer," as generally described in an article "MAC-4: A Single-Chip Microcomputer," by W. F. Chow and W. W. Troutman, *The Bell System Technical Journal*, Vol. 58, No. 4 pp. 959-962 (April 1979). This is a versatile, low power microcomputer chip that can be used as a controller for various functions in a telephone set, including the voice-activated switching functions for the speech network of this application, and can be driven solely from the central office input signals, without the use of auxiliary power sources. In my copending application referred to earlier, there is illustrated and described further details of power and reset circuits for the microcomputer chip, as well as its use as a sensing and switching unit for the current initialization circuit 21 forming the subject matter of that application. Further details of the MAC-4 microcomputer and operation may be obtained from the following copending patent applications, herein incorporated by reference:

(1) V. K-L. Huang—R. L. Ruth, Ser. No. 974,426, filed Dec. 29, 1978, entitled "Data Processing Apparatus Having Opcode Extending Register";

(2) D. E. Blahut—D. H. Copp—D. C. Stanzione, Ser. No. 974,425, filed Dec. 29, 1978, entitled "Data Processing Apparatus Providing Variable Operand Width Operation";

(3) D. E. Blahut—D. H. Coop—D. C. Stanzione, Ser. No. 974,363, filed Dec. 29, 1978, entitled "Data Processing Apparatus Providing Autoloading of Memory Pointer Registers";

(4) D. E. Blahut—D. H. Coop—D. C. Stanzione, Ser. No. 974,361, filed Dec. 29, 1978, entitled "Data Processing Apparatus Providing Autoincrementing of Memory Point Registers";

(5) D. E. Blahut—R. L. Ukeiley, Ser. No. 71,712, filed Aug. 31, 1979, entitled "Microprocessor Using a Double Op Code Instruction";

(6) D. E. Blahut—V. K-L. Huang, R. L. Townsend, Jr. Ser. No. 71,750, filed Aug. 31, 1979, entitled "Microcomputer Arranged for Direct Memory Access"; and (7) V. K-L. Huang, Ser. No. 71,719, filed Aug. 31, 1979, entitled "Special Address Generation Arrangement".

While one specific embodiment of the invention has been described in detail herein, it should be obvious that various modifications may be made from the specific details described, without departing from the spirit and scope of the invention.

What is claimed is:

1. A speech network for a telephone set having a receiver circuit and a transmitter circuit connected in parallel between tip and ring leads connected to a telephone line, which comprises:
    (a) transistor means for amplifying speech signals;
    (b) first circuit connecting means for normally connecting the transistor means between tip and ring in a first configuration or receive mode, for amplifying a received signal from the line and for applying the amplified receive signal to the receiver circuit;
    (c) second circuit connecting means for connecting the transistor means between tip and ring in a second and different configuration or transmit mode, for amplification of the transmitter output by the transistor means and transmission of an amplified transmit signal to the line; and
    (d) switching means, actuated by a voice-signal output from the transmitter, for switching the circuit connecting means from the receive mode to the transmit mode in response to a transmitter output above a predetermined threshold level.

2. A network as recited in claim 1, further comprising:
    sidetone signal means, connected to the receiver circuit by the switching means when a voice signal output is received from the transmitter, for applying a reduced portion of the amplified transmit signal to the receiver.

3. A network as recited in claim 1 or claim 2, wherein the transistor means includes:
    a bipolar first transistor having its collector-emitter circuit connected between the tip and ring leads in parallel with the receiver circuit; and
    a first capacitor normally connected by the switching means between the base of the first transistor and the ring lead, thereby establishing the receive mode of the transistor means.

4. A network as recited in claim 3, wherein:
    the transmitter output is connected to the base of the first transistor by a second capacitor;
    the transistor means further includes a third capacitor connectable by the switching means between the emitter of the first transistor and the ring lead; and
    the switching means includes a threshold detector for sensing a transmitter output above a certain level establishing the transmit mode, a first switch operated by the detector in the transmit mode for disconnecting the first capacitor from the ring lead, and a second switch operated by the detector in the transmit mode for connecting the third capacitor to the ring lead.

5. A network as recited in claim 4, wherein the threshold detector includes a second bipolar transistor having its base connected to the transmitter by a fourth capacitor and having its collector-emitter circuit connected in a triggering circuit for operating the switching means to change the state of the first and second switches whenever the output from the transmitter is above a preset threshold level to switch the first transistor from the receive mode to the transmit mode.

6. A speech network for a telephone set having a tip and ring leads connected to a telephone line, which comprises:
   a receiver circuit connected between tip and ring and including a first resistor, a first capacitor, and a telephone receiver connectable in series by line switch contacts between tip and a first circuit node, and a second resistor connected between the first circuit node and ring;
   a first transistor, being a bipolar transistor amplifier, having its collector-emitter circuit connected between tip and the first circuit node in parallel with the receiver circuit;
   a second capacitor normally connected between the base of the first transistor and ring defining a receive mode of the first transistor arranged so that received signals are amplified by the first transistor and applied to the receiver;
   a transmitter circuit connected between tip and ring in parallel with the receiver circuit; and
   means activated by a voice-signal output from the transmitter for switching the first transistor from the receive mode to a transmit mode for amplification of the transmitter output by the first transistor and transmission of an amplified transmit signal to the line.

7. A network as recited in claim 6, wherein:
   the transmitter output is connected to the base of the first transistor by a third capacitor;
   a fourth capacitor is arranged for connection by the switching means in the transmit mode between the emitter of the first transistor and ring; and
   the switching means includes a threshold detector for sensing a transmitter output above a certain level establishing the transmit mode, a first switch operated by the detector in the transmit mode for disconnecting the second capacitor from the ring lead, and a second switch operated by the detector in the transmit mode for connecting the fourth capacitor to the ring lead.

8. A network as recited in claim 7, wherein the threshold detector includes a second bipolar transistor having its base connected to the transmitter by a firth capacitor and having is collector-emitter circuit connected in a triggering circuit for operating the switching means to change the state of the first and second switches whenever the transmitter output is above a preset threshold level to switch the first transistor from the receive mode to the transmit mode.

9. A network as recited in any of claims 6, 7 or 8, further comprising:
   sidetone signal means, connected in parallel with the receiver circuit by the switching means when a voice signal output is received from the transmitter, for applying a reduced portion of the amplified transmit signal to the receiver.

10. A network as recited in claim 9, wherein the sidetone signal means comprises:
   a third resistor and an additional bipolar transistor having its collector-emitter circuit connected in series with the third resistor between the first circuit node and a second circuit node defined between the first resistor and the first capacitor and arranged so that, when the additional transistor is turned ON, a voltage divider circuit is provided between the first and third resistors and the additional transistor is connected in parallel with the receiver between the first and second nodes so as to provide sidetone to the receiver during the transmit operation, the second transistor being turned ON by the switching means when a voice signal output is received from the transmitter.

* * * * *